Jan. 9, 1940. H. O. DROTNING 2,186,633
PHOTOGRAPHIC CAMERA
Filed Sept. 23, 1938
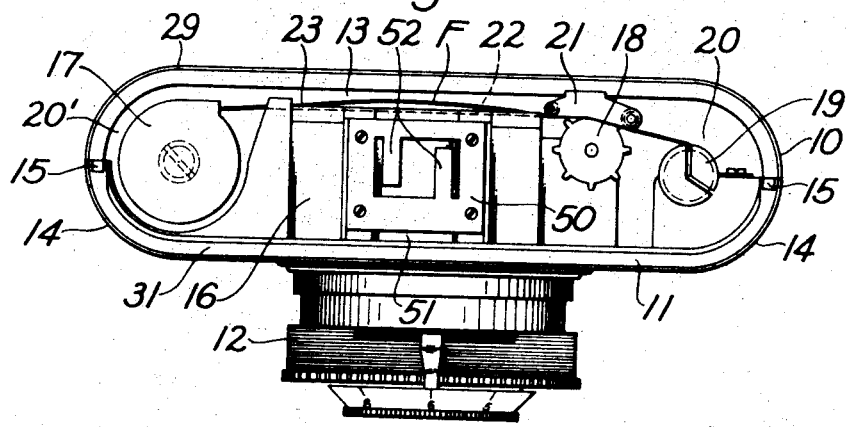
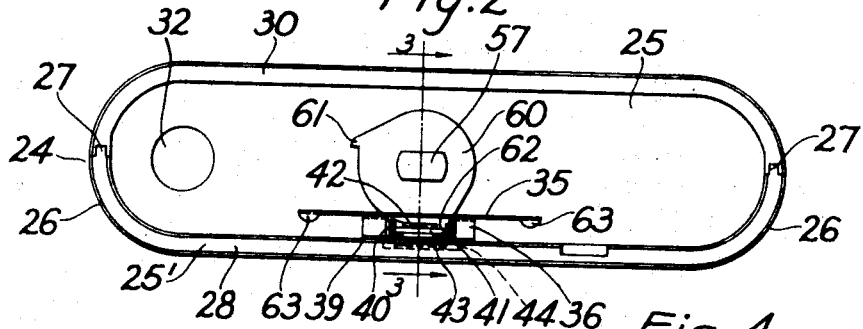
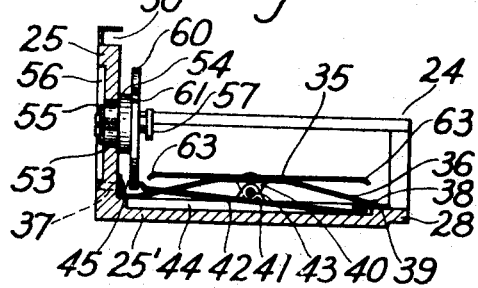
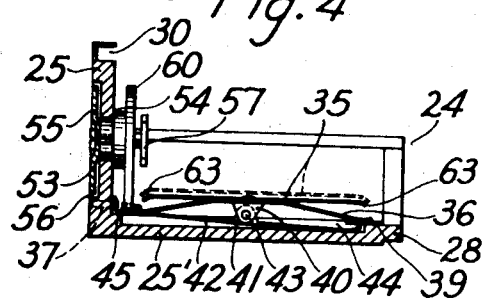
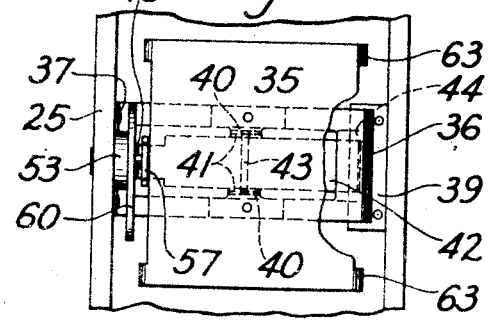
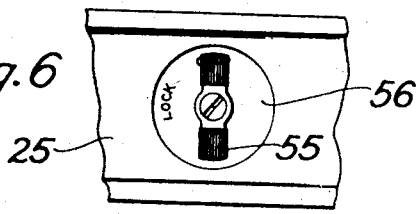
Henry O. Drotning
INVENTOR Patented Jan. 9, 1940

2,186,633

UNITED STATES PATENT OFFICE 2,186,633

PHOTOGRAPHIC CAMERA

Henry O. Drotning, Rochester, N. Y., assignor to Eastman Kodak Company, Rochester, N. Y., a corporation of New Jersey Application September 23, 1938, Serial No. 231,377

8 Claims. (Cl. 95—31)

The present invention relates to photography, and more particularly to roll film cameras having backs which are completely removable for film loading purposes.

One object of the present invention is to provide a simple type of camera having a film back which is completely removable from the camera for the purpose of loading the camera with film. Another object is to provide such a camera in which the back is adapted to be slid laterally off from the camera to be removed, which back includes a spring pressed film guide which aids in positioning the film in the focal plane of the camera. And another object is to provide a means for locking the back on the camera, which means includes a latch member rotatably mounted on the back. A further object is to provide an operative connection between said latch member and film guide whereby the latter is retracted from its guiding position when the latch member is moved to its unlocking position, so that the film guide will not tend to abut and injure the film strip when the back is slid onto the camera. A still further object is to provide such a connection which includes the fewest number of parts, and wherewith the film guide in moving to and from its guiding position is maintained parallel to the focal plane of the camera. Another object is to provide a camera of the type described which is simple in construction, efficient in operation and easy to assemble.

Briefly, my invention comprises a camera having a back which is adapted to be removed from the camera by being slid laterally therefrom. Said camera back includes a film guide which is normally spring pressed toward the focal plane of the camera to aid in positioning the film in said plane. The back is locked onto the camera by a locking means including a latch member rotatably mounted on the back, and an operative connection is provided between said latch member and said film guide, whereby the film guide is retracted from the focal plane of the camera when the latch member is moved to its unlocking position.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which, Fig. 1 is a bottom view of a typical camera constructed in accordance with a preferred embodiment of the invention, and with the camera back removed, Fig. 2 is a side elevation of the interior of the camera back, Fig. 3 is a section taken substantially on line 3—3 of Fig. 2, and showing the latch member in its locking position, Fig. 4 is the same as Fig. 3, but showing the latch member in its unlocking position, Fig. 5 is a plan view of that portion of the camera back including the film guide, and showing the manner of mounting the same in the back, and Fig. 6 is an exterior side elevation of that portion of the camera back including the latch member, and showing how its position is indicated to the operator.

Like reference characters refer to corresponding parts throughout the drawing.

While for the purpose of illustration I have shown the invention in combination with a miniature camera of the type generally using perforated 35-mm. film, it will be understood that the same is adapted for use with any roll film camera having a back removable for loading purposes, and is not dependent upon the size of the camera or the type of film used.

Referring now to Fig. 1, the camera may consist of a body portion 10, which may be made from a suitable moulded composition, including a front wall 11 on which the shutter and lens unit 12 are mounted, and a top wall 13. The ends of the front wall are curved rearwardly, as indicated at 14, to form part of the end walls of the camera, and the ends of these curved portions are provided with grooves 15. Extending rearwardly from the rear face of the front wall 11 and directly behind the lens unit is a hollow rectangular frame 16, the rear end of said frame terminating substantially in the focal plane of the lens and constituting an exposure frame across which the film F is fed. The film F, which in the instance shown as perforated 35-mm. film, may be wound from a retort 17 or from a film spool journaled in a film spool chamber 20', across the exposure frame 16, over a sprocket 18, and onto a takeup spool 19 journaled in the spool chamber 20. The takeup and supply spools are drivingly connected with the usual winding knobs not shown, extending to the outside of the top wall 13 so that the film can be advanced for exposing purposes, and rewound into the retort after complete exposure. The sprocket 18 may be a counter sprocket usually found in cameras of this type which is operatively connected with a counter visible in the top wall of the camera so as to give a visual indication of the number of exposures made, said sprocket being rotated by the advancing film strip. The film F may be held in proper engagement with the counter sprocket by a guide member 21, which may be pivoted to the camera body so as to be raised from said sprocket during the loading of the camera. For the purpose of guiding the film strip laterally the rear end of the exposure frame 16 is provided with a groove indicated at 22, which groove is the same width as the film F and of a depth equal to or slightly greater than the thickness of the film. Thus the extreme edges of the exposure frame 16 surrounding grooves 22 form rails 23 which extend to or slightly above the top surface of the film F when the frame is correctly positioned across the exposure frame 16.

The camera back, indicated generally as 24, is adapted to be slid onto and off of the camera body 10 laterally, and constitutes the bottom wall 25 and the back wall 25' of the camera. The ends 26 of the back wall 25' are curved forwardly and provided with tongues 27 which are adapted to engage grooves 15 in the ends of the front wall of the camera body when the back is slipped on to said body, said tongue and groove connection making a light-tight joint. The light-tight connection between the camera back and body at the other points of division are proportions vided for by having a reduced portion 28 at the free edge of the back wall 25' which is adapted to slip under a metal overhang 29 around the edge of the top wall 13, and having a metal channel 30 around the edge of the bottom wall 25 which is adapted to receive a tongue 31 around the edge of the front wall of the camera. The bottom wall 25 of the camera back 24 may be provided with a circular recess 32 into which a trunnion on the retort 17 may extend to rotatably support the same at both ends.

It is common in roll film cameras to provide a spring pressed film pad on the camera back which is adapted to press against and hold the film flat in the focal plane when the camera back is placed on the camera. These film pads are usually connected to the camera back by means of springs which normally urge them away from the back and toward the focal plane of the camera. Such film pads are satisfactory with cameras having hinged backs where the pad will be normally brought down against the rear face of the film when the back is closed, but are not so satisfactory with cameras having backs which are slid off and onto the camera body laterally as in the camera shown. Referring to Fig. 1, it will be noticed that the portion of the film F above the exposure frame 16 is slightly bowed above the same instead of being flat in the groove 22 formed therein. This generally is the condition of a film strip at the time of threading, and it will be appreciated that if the present camera back, which is slid laterally onto the camera body, were provided with the usual type of film pad which is normally extended into or below the focal plane of the camera, that the edge of such pad would undoubtedly engage the edge of the film strip when the back was slid onto the camera body thus causing a buckling of the film and a resistance to the placing of the back on the camera.

To overcome this difficulty and still provide a film guide for properly locating the film in the focal plane of the camera when the camera back is on, I provide the following arrangement whereby the spring pressed film guide is automatically retracted from its guiding position when the locking means for the back is opened, and which is released by said locking means when the same is moved to its locking position.

Referring now to Figs. 2-6, the film guide 35 is fastened to a bowed spring 36 which is in turn fixed at one end to the bottom wall 25 by any suitable means, for example rivets 37. The other end 38 of the bowed spring 36 is turned up and rests upon a metal plate 39 fixed in the back wall 25' of the camera back. Extending from the bowed spring 36 are a pair of spaced ears 40 to which a similar pair of spaced ears 31 on the lever 42 are pivoted by a pin 43 extending through said four ears. The back wall 25' of the camera back adjacent the lever 42 is provided with a recess 44 which extends under the metal plate 39 fixed to said back wall. One end of the lever 42 is fulcrumed between the bottom of said recess 44 and the metal plate 39, while the other end 45 of the lever 42 extends beyond the edge of the film guide and is normally raised by the action of the bowed spring 36.

The means for locking the camera back onto the camera body comprises a catch plate 50 fixed over a recess 51 in the frame 16 on the camera body, said catch plate being formed so as to have two substantially resilient fingers 52 behind which the catch member on the camera back engages to lock the two parts together. The camera back is provided with a latch member comprising a stud 53 extending through and rotatably mounted relative to the bottom wall 25 of the camera back. The stud is held against longitudinal movement relative to the wall 25 by virtue of the shoulder 54 engaging the inside face of said wall, and the key member 55 screwed to the end of the stud and resting in a recess 56 formed in the outside face of the bottom wall. The inner end of the stud 53 is provided with a catch member 57 which is adapted, when in the position shown in Fig. 4, to extend between the fingers 52 on catch plate 50, and into the recess 51, and when turned to the position shown in Fig. 3, is adapted to extend across the fingers 52 of the catch plate 50 to prevent the back from being slid off from the camera body. The catch member 57 is turned from the outside of the camera back by means of a key member 55 fixed to the stud 53, and the position of the catch member is indicated by the position of the key in the recess which is provided with two marked positions, one marked, "locked," and one marked, "open." When the key is in the position shown in Fig. 6 the word "locked" is uncovered specifying that the latch is in its open position and should be turned to lock the back on the camera.

So that the film guide will be automatically retracted when the camera back is unlatched, a cam 60 is fixed to the stud 53 to engage the end 45 of the lever 42. The face of this cam is so formed that when the latch member is moved to its open position for the removal of the camera back, the cam will act to press down upon the end 45 of the lever 42, whereupon the film guide 35 is drawn down against the action of the bowed spring 36. It will be apparent that since the lever 42 pulls down directly in the center of the film guide, and the end of the bowed spring 36 is free to slide on the metal plate 39 during such depression, that the film guide will be maintained in a plane parallel to the focal plane of the camera throughout its movement to and from its guiding position. After the camera has been loaded, the back may be readily slid back onto the camera body without danger of the film guide abutting the film strip, since said guide is held in its retracted position; and upon the replacement of the camera back and a locking of the latch member the film guide 35 will be returned to its guiding position by the bowed spring 36. It will be readily appreciated that the end 45 of the lever 42 is maintained in engagement with the cam 60 at all times due to the action of the bowed spring 36, hence the face of said cam must be so formed as to allow the bowed spring 36 to return the film guide 35 to its film guiding position when the latch member is in its locking position. The locking and unlocking positions of the latch member on the camera back are positively determined by abutments 61 and 62 on the cam 60 which come into abutment with the end 45 on the lever 42 in the two extreme positions of the latch member. The tension of the spring 36 or the form of the face of the cam 60 are not stringently controlled so as to insure proper pressure of the film guide in its guiding position, because in such position the film guide does not directly engage the film strip. The film guide 35 is preferably provided wtih a lug 63 at each corner, which lug is adapted to extend beyond the sides of the film groove 22 and the exposure frame 16 to engage the rails 23 at the edges of said groove. Thus the pressure of the film guide 35 is exerted on the exposure frame alone, and the film guide merely comes down upon said exposure frame to form with the groove 22 therein a film channel at the focal plane of the camera through which the film is directed.

Although I have shown and described a specific embodiment of my invention, I am fully aware that many modifications thereof are possible. My invention, therefore, is not to be restricted except in so far as is necessitated by the prior art and by the spirit of the appended claims.

Having thus described my invention what I declare is new and desire to secure by Letters Patent of the United States is:

1. In a roll film camera, the combination with a camera body, means at one side of the body for supporting a supply roll of unexposed film, means at the other side of the body for supporting a take-up roll for winding film from said supply roll, and an exposure frame between said rolls across which the film is advanced in the focal plane of the camera, of a camera back completely removable from said camera body for loading purposes, a film guide carried by said camera back and movable to and from a guiding position wherein it cooperates with said exposure frame to form a film channel at the focal plane of the camera, means for locking said back on the camera body, and including a latch member on said camera back, and an operative connection between said latch member and said film guide, whereby the film guide is moved to and from its guiding position when the latch member is moved to and from its locking position, respectively.

2. In a roll film camera, the combination with a camera body, means at one side of the body for supporting a supply roll of unexposed film, means at the other side of the body for supporting a take-up roll for winding film from said supply roll, and an exposure frame between said rolls across which the film is advanced in the focal plane of the camera, of a camera back completely removable from said camera body for loading purposes, a film guide carried by said camera back and movable to and from a guiding position wherein it cooperates with said exposure frame to form a film channel at the focal plane of the camera, means normally forcing said film guide into its guiding position, means for locking said back on the camera body, and including a latch member on said camera back, and an operative connection between said latch member and said film guide, whereby the film guide is adapted to be retracted from its guiding position when said latch member is moved to its unlocking position.

3. In a roll film camera, the combination with a camera body, means at one side of the body for supporting a supply roll of unexposed film, means at the other side of the body for supporting a take-up roll for winding film from said supply roll, and an exposure frame between said rolls across which the film is advanced in the focal plane of the camera, of a camera back completely removable from said camera body for loading purposes, a film guide carried by said camera back and movable to and from a guiding position wherein it cooperates with said exposure frame to form a film channel at the focal plane of the camera, said film guide normally spring pressed into its guiding position, means for locking said back on the camera body, and including a latch member rotatably mounted on said camera back for movement between a locking and an unlocking position, and an operative connection between said latch member and said film guide, whereby the film guide is adapted to be retracted from its guiding position when said latch member is moved to its unlocking position.

4. In a roll film camera, the combination with a camera body, means at one side of the body for supporting a supply roll of unexposed film, means at the other side of the body for supporting a take up roll for winding film from said supply roll, and an exposure frame between said rolls across which the film is advanced in the focal plane of the camera, of a camera back completely removable from said camera body for loading purposes, a film guide carried by said camera back and movable to and from a guiding position wherein it cooperates with said exposure frame to form a film channel at the focal plane of the camera, said film guide normally spring pressed into its guiding position, means for locking said back on the camera body, and including a latch member rotatably mounted on said camera back for movement between a locking and an unlocking position, and an operative connection between said latch member and said film guide, whereby the film guide is adapted to be retracted from its guiding position when said latch member is moved to its unlocking position, said operative connection including means for positively limiting the movement of said latch member in its locking and unlocking position.

5. In a roll film camera, the combination with a camera body, means at one side of the body for supporting a supply roll of unexposed film, means at the other side of the body for supporting a take-up roll for winding film from said supply roll, and an exposure frame between said rolls across which the film is advanced in the focal plane of the camera, of a camera back completely removable from said camera body for loading purposes, a film guide carried by said camera back and movable to and from a guiding position wherein it cooperates with said exposure frame to form a film channel at the focal plane of the camera, said film guide normally spring pressed into its guiding position, means for locking said back on the camera body, and including a latch member rotatably mounted on said camera back for movement between a locking and an unlocking position, and an operative connection between said latch member and said film guide, whereby the film guide is adapted to be retracted from its guiding position when said latch member is moved to its unlocking position, said operative connection being such that the film guide in moving to and from its film guiding position is maintained in parallel planes.

6. In a roll film camera, the combination with a camera body, means at one side of the body for supporting a supply roll of unexposed film, means at the other side of the body for supporting a take-up roll for winding film from said supply roll, and an exposure frame between said rolls across which the film is advanced in the focal plane of the camera, of a camera back completely removable from said camera body for loading purposes, a film guide carried by said camera back and movable to and from a guiding position wherein it cooperates with said exposure frame to form a film channel at the focal plane of the camera, said film guide normally spring pressed into its guiding position, means for locking said back on the camera body, and including a latch member rotatably mounted on said camera back for movement between a locking and an unlocking position, and an operative connection between said latch member and said film guide, whereby the film guide is adapted to be retracted from its guiding position when said latch member is moved to its unlocking position, said operative connection including a cam member fixed to and rotated by said latch member.

7. In a roll film camera, the combination with a camera body, means at one side of the body for supporting a supply roll of unexposed film, means at the other side of the body for supporting a take-up roll for winding film from said supply roll, and an exposure frame between said rolls across which the film is advanced in the focal plane of the camera, of a camera back completely removable from said camera body for loading purposes, a film guide carried by said camera back, means for attaching said film guide in said camera back whereby it is movable to and from a guiding position wherein it cooperates with said exposure frame to form a film channel at the focal plane of the camera, and is normally moved to said guiding position, said means including a bowed spring attached to said camera back and to said film guide, means for locking said back on the camera body, and including a latch member rotatably mounted on said camera back for movement between a locking and an unlocking position, and an operative connection between said latch member and said film guide, whereby the film guide is adapted to be retracted from its guiding position when said latch member is moved to its unlocking position, said connection comprising a lever connected to said film guide and pivoted at one end to said camera back, and a cam fixed to said latch member to be rotated therewith and arranged to engage and depress said lever when the latch member is moved to its unlocking position.

8. In a roll film camera, the combination with a camera body, means at one side of the body for supporting a supply roll of unexposed film, means at the other side of the body for supporting a take-up roll for winding film from said supply roll, and an exposure frame between said rolls across which the film is advanced in the focal plane of the camera, of a camera back completely removable from said camera body for loading purposes, a film guide carried by said camera back, means for attaching said film guide in said camera back, whereby it is movable to and from a guiding position wherein it cooperates with said exposure frame to form a film channel at the focal plane of the camera and is normally moved to said guiding position, said means including a bowed spring attached to said camera back and to said film guide, means for locking said back on the camera body, and including a latch member rotatably mounted on said camera back for movement between a locking and an unlocking position, and an operative connection between said latch member and said film guide, whereby the film guide is adapted to be retracted from its guiding position when said latch member is moved to its unlocking position, and adapted to be limited in its movement to its guiding position when said latch member is moved to its locking position, said operative connection comprising a cam fixed to said latch member to be rotated therewith, and a lever pivoted at one end to the camera back and including a portion adapted to be engaged by said cam, said lever connected to said film guide to be normally held in engagement with said cam by the action of said bowed spring.

HENRY O. DROTNING.